_United States Patent_ [15] 3,675,289
Mark [45] July 11, 1972

[54] APPARATUS AND METHOD FOR PREPARING PIPED COVERING MATERIALS

[72] Inventor: Alfred J. Mark, Newtonville, Ontario, Canada

[73] Assignee: Chrysler Corporation, Highland Park, Mich.

[22] Filed: May 27, 1970

[21] Appl. No.: 40,980

[52] U.S. Cl. ............................... 29/91, 29/91.1, 297/DIG. 1
[51] Int. Cl. ........................................................... B68g 13/02
[58] Field of Search ............... 29/91, 91.1, 91.2, 91.3, 91.4, 29/91.5, 91.7; 112/3 R, 3 A; 297/DIG. 1

[56] References Cited

UNITED STATES PATENTS

| | | | |
|---|---|---|---|
| 1,903,618 | 4/1933 | Brinthall | 29/91 X |
| 3,273,180 | 9/1966 | Feinerman | 297/DIG. 1 |

FOREIGN PATENTS OR APPLICATIONS

| | | | |
|---|---|---|---|
| 522,432 | 1940 | Great Britain | 29/91.2 |
| 759,644 | 1933 | France | 29/91.2 |
| 668,414 | 1963 | Canada | 29/91.1 |

_Primary Examiner_—Frank T. Yost
_Attorney_—Talburtt and Baldwin

[57] ABSTRACT

A method and apparatus for preparing upholstery covering including sharply defined pipes wherein rotary cutting blades are used to cut slits in a riser material; a fabric is subsequently placed over the riser material, pleated into the slits and sewed therein to the riser material to form a series of pipes in the covering.

12 Claims, 14 Drawing Figures

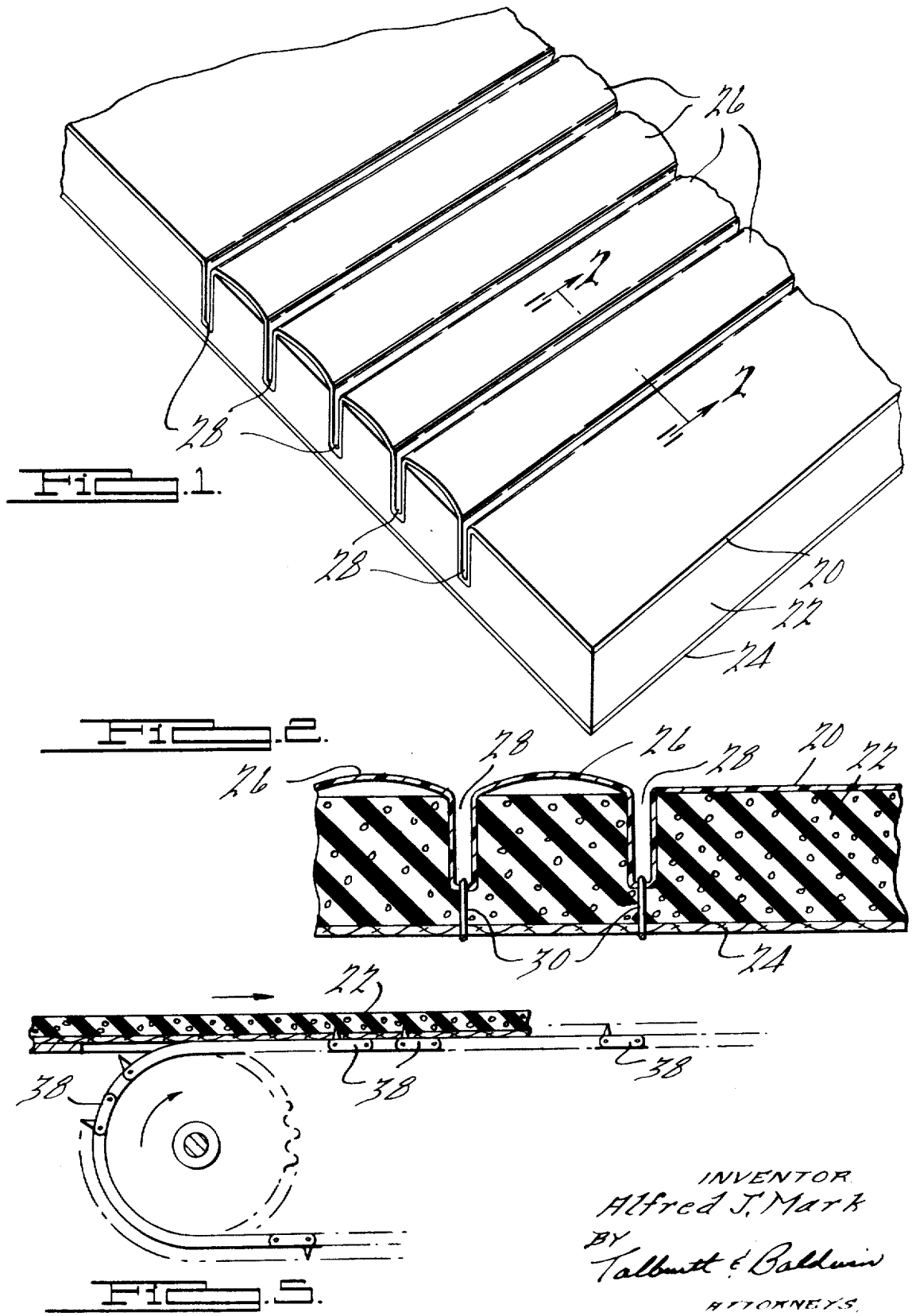

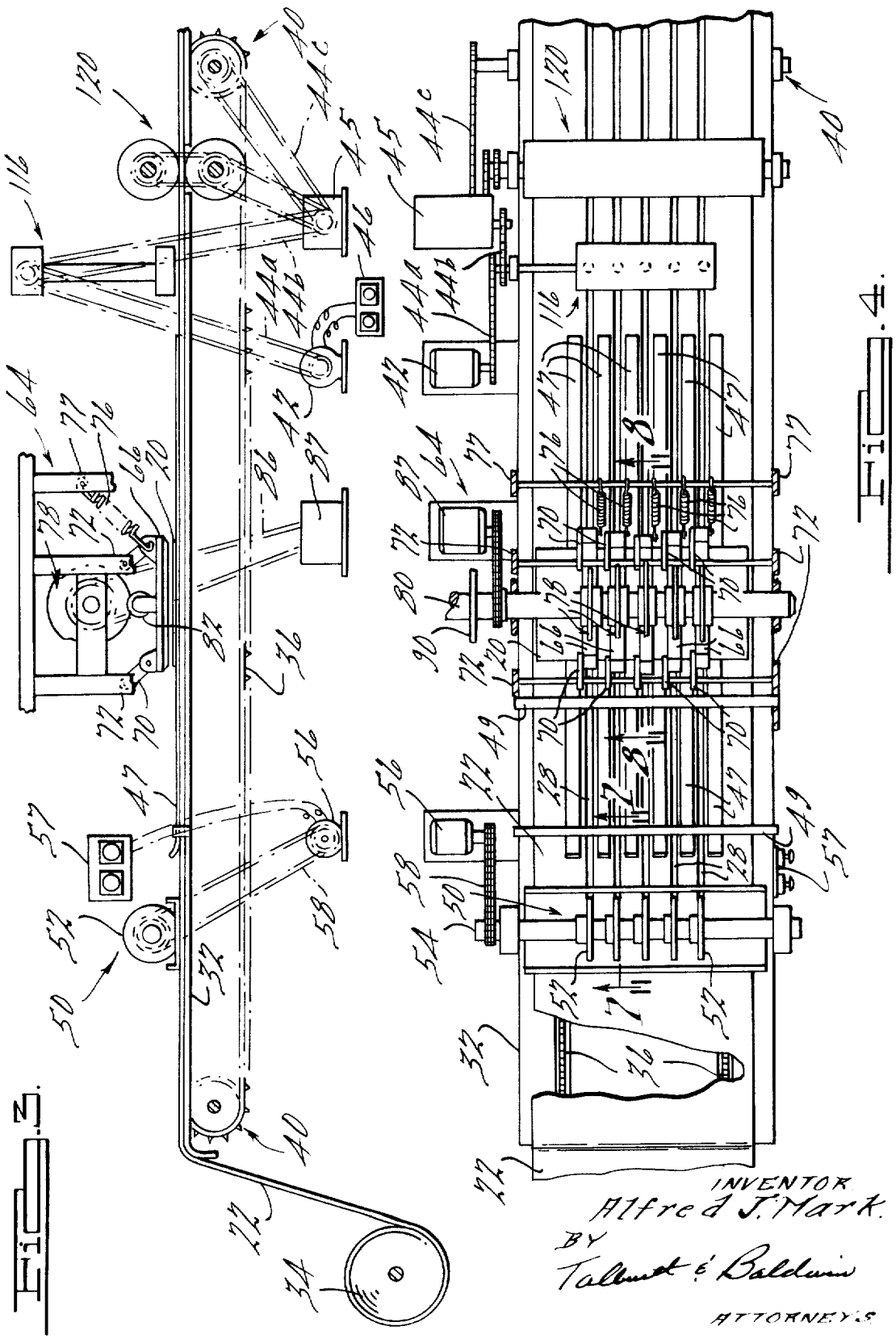

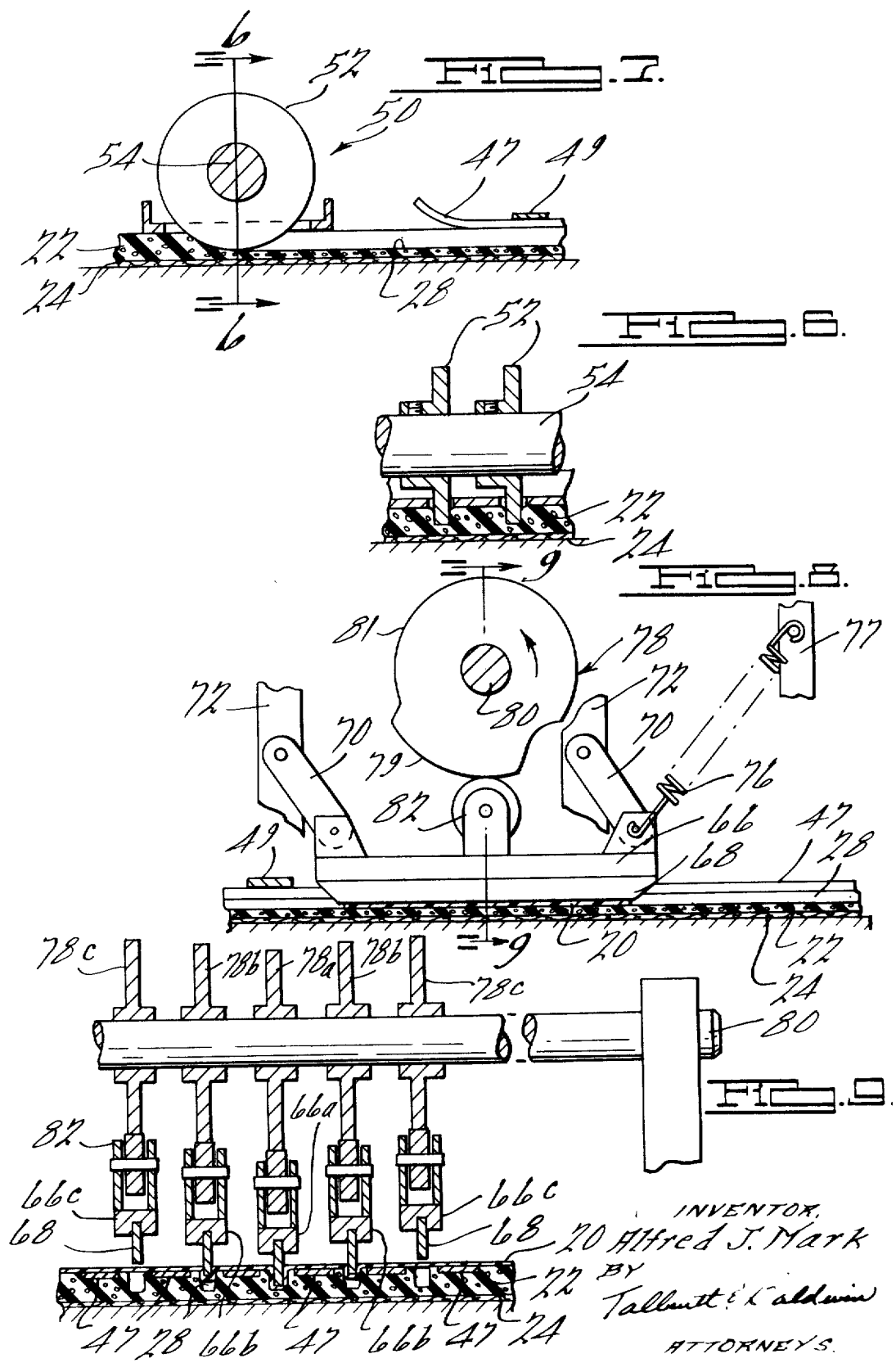

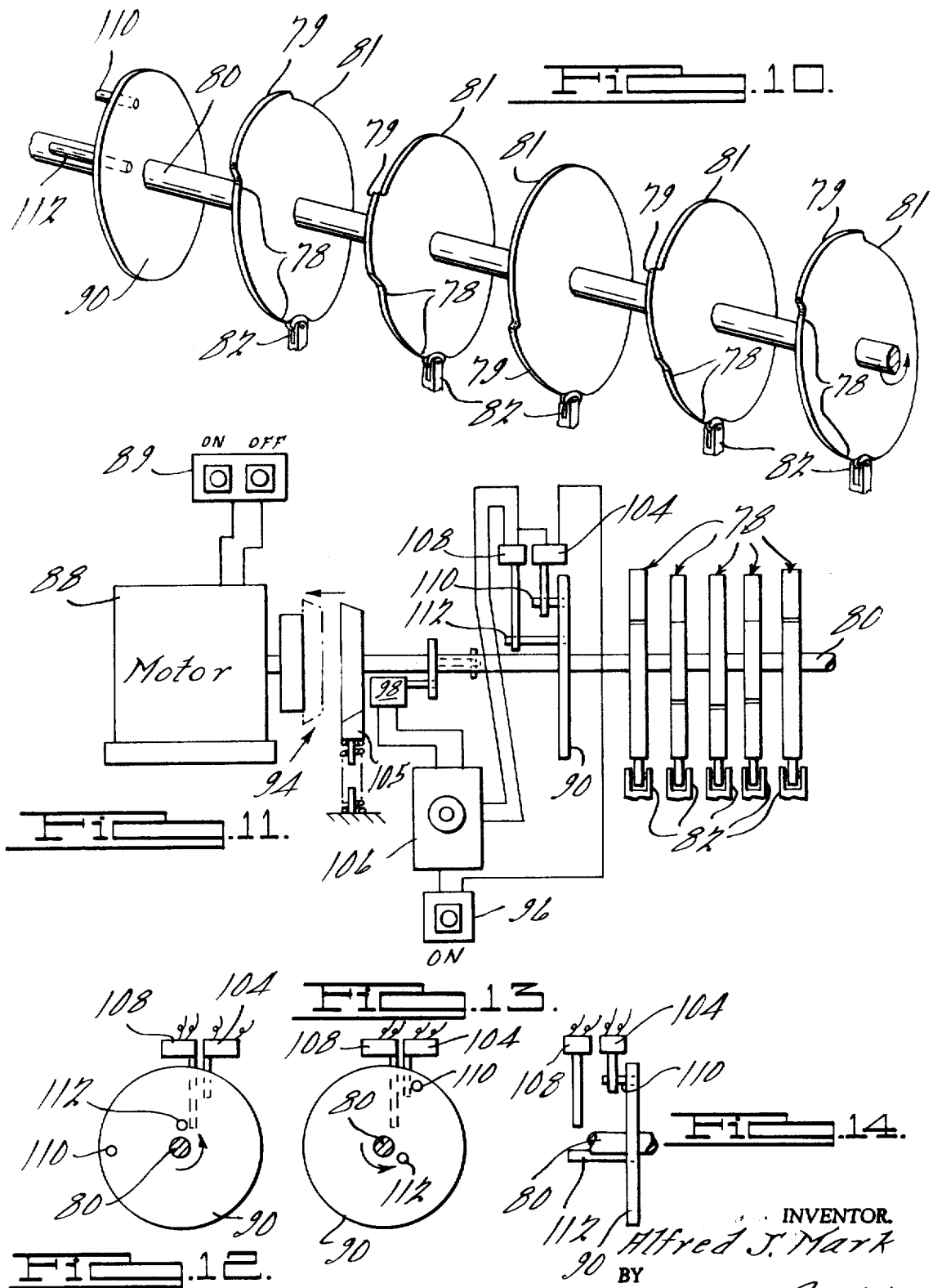

3,675,289

APPARATUS AND METHOD FOR PREPARING PIPED COVERING MATERIALS

BACKGROUND OF THE INVENTION

This invention relates generally to automobile upholstery, trim panels and the like. More specifically, it relates to a method of manufacturing piped covering materials for upholstery and the like and an apparatus for practicing the method.

It has become desirable, particularly in automobile upholstery and trim panels, to provide covering materials which have highly defined piping. It is an object of this invention to provide a method and apparatus for providing such covering materials in a more efficient manner then has been heretofore available in the art.

By way of background, it is helpful to define some of the terms which will be referred to herein.

The term "riser" is meant in general to specify rubber or non-rubber materials fabricated in such a way as to have interstitial voids providing a certain amount of resilience to the touch and capable of recovering its shape when temporary deforming pressures are removed. It is also desirable that such material be chemically inert at least relative to the other assembly components of the covering material. The riser material may also be of a "felt" material which usually consists of a blend of torn up wastepaper and rags suitably blended to provide the requisite strength required for typical upholstery applications.

The term "backing" is meant to include flexible materials such as cotton, wool, rayon, glass fibers, synthetic fibers, etc. which are added to the riser material to give it additional strength.

The term "fabric" is meant to include leather, plastic materials, i.e., the vinyl chloride, vinylidene chloride and other similar synthetics formed into flexible sheets with finishes simulating leather woven fabrics, etc., and cloth materials such as those formed of woven fabrics of the natural, synthetic and glass type.

Preferably, the materials to be used when automobile upholstery material is being prepared according to this invention consist of 9/16 inch urethane foam sheeting as the riser material laminated to a relatively thin backing such as 4 oz./sq. yard cotton sheeting. The covering fabric may be one of the common simulated leather vinyls, nylon or the like.

SUMMARY OF THE INVENTION

The gist of the invention lies in the formation of substantially parallel slits in the riser material, the pleating or pressing of the fabric into the slits to form pipes and the sewing of the fabric to the riser and backing at the bottom of each of the slits.

Insofar as the apparatus of this invention is concerned, the primary features comprise the use of spaced rotary blades to cut the slits in the riser material, a special forming apparatus for pressing the fabric into the slits in a predetermined manner to accomplish the preliminary formation of the pipes and the automated sewing of the fabric to the riser material. All of these operations are formed on a work surface over which the materials are moved by means of a drag chain or endless conveyor type of arrangement. The various operations are interrelated and controlled electrically for sequential processing.

BRIEF DESCRIPTION OF THE DRAWINGS

FIG. 1 shows a section of automobile upholstery covering prepared according to this invention including a plurality of pipes.

FIG. 2 is a cross section view of a portion of the covering material shown in FIG. 1 taken along lines 2—2 of that Figure.

FIG. 3 is a side elevation of the apparatus according to this invention.

FIG. 4 is a plan view of the apparatus of FIG. 3.

FIG. 5 is a fragmentary detailed showing of the preferred conveyor means utilized on the apparatus of this invention for moving the material over the work surface.

FIG. 6 is a fragmentary sectional view of the cutter blades taken along lines 6—6 of FIG. 7.

FIG. 7 is a section view, taken along lines 7—7 of FIG. 4, of the preferred cutting means for forming the slits in the riser material which comprises a plurality of spaced rotary cutter blades or routers.

FIG. 8 is a fragmentary sectional view, taken along lines 8—8 of FIG. 4, of that portion of the apparatus which pleats the fabric into the slits in the riser material, hereinafter referred to as the forming means. In this Figure the forming means position is changed to the lowered position as compared to the raised position shown in FIGS. 3 and 4.

FIG. 9 is a fragmentary sectional view taken along lines 9—9 of FIG. 8.

FIG. 10 is a fragmentary schematic showing of a cam and cam follower arrangement for use with the invention.

FIG. 11 is a fragmentary schematic showing of a drive means for use with a portion of an apparatus according to the invention.

FIGS. 12, 13 and 14 are views of a limit switch energizing arrangement for the drive means shown in FIG. 11, FIGS. 12 and 13 showing the same part in different rotational positions.

DESCRIPTION OF THE PREFERRED EMBODIMENT

FIGS. 1 and 2 are illustrative of the type of covering material contemplated by this invention including a vinyl fabric 20 lying on a urethane riser 22, the riser being laminated to a backing 24 for strength. Pipes indicated at 26 are formed in the covering material by pressing fabric 20 down into a plurality of slits 28 in riser 22 and sewing fabric 20 to both the riser and backing at the bottom of each of the slits as indicated by stitching 30 in FIG. 2.

Referring now to FIGS. 3, 4 and subsequent, the preferred method of preparing the piped covering material shown in FIGS. 1 and 2 will be described in conjunction with the description of an apparatus embodying this invention. The apparatus includes a substantially flat elongate working surface support or working table 32 onto which riser material 22 may be drawn, such as from a supply roll 34, and moved over working surface 32, from left to right as shown for example, by a conveyor means such as chain drag 36 consisting of a pair of endless loops of toothed chain links 38, as best shown in FIG. 5. Links 38 are engaged by a pair of gear assemblies generally indicated at 40 in FIGS. 3 and 4 which are supported at opposite ends of work surface 32 as shown. Chain drag 36 is operated by motor 42 which is connected to the chain drag by means of belts 44a, 44b, 44c and a gear box 45. Gear box 45 is required in this particular arrangement because motor 42 is also used to drive sewing machine means 116. Suitable gear boxes of this type are well known. The motor is energized and de-energized by means of the control button assembly indicated at 46. The chain links are arranged relative to the work surface so that the teeth on the links extend above the surface to "drag" the material as indicated in FIG. 5, thus moving it along the work surface under the spaced support fingers 47. The support fingers are positioned so as to expose the slits cut into the riser as shown in FIG. 4 and are supported by spaced crosspieces 49 which may be suitably attached at the sides of work surface 32.

Cutting or router means such as the cutting blade assembly generally indicated at 50 is carried above the upper surface of work table 32, near one end thereof for forming a plurality of spaced substantially parallel slits in the riser material. Slits 28 are best seen in FIG. 4. Cutting blade assembly 50 consists of a plurality of cutter blades 52 carried on a rotatable shaft 54 as can best be seen in FIG. 4. The cutter blades are preferably carborundum faced wheels of the well known type and can be positioned along shaft 54 by means of a set screw or the like, as can be seen in FIG. 6, to provide any desired spacing between the slits which are to be cut to a predetermined depth in the riser material as the riser moves over the surface of the working table beneath the rotating cutting blades. Shaft 54 is turned by motor 56 which is connected thereto by drive belt 58 as shown in FIGS. 3 and 4.

For the arrangement shown, five parallel slits 28 are cut to a predetermined depth in the urethane riser 22 as it passes beneath the cutter blades. The slits 28 preferably have a depth in the riser of about two-thirds of the riser thickness as best seen in FIG. 7.

After a desired length of the riser has been moved past the cutting means, the chain drag is stopped so that the slits are at a position under a forming means assembly, generally indicated at 64, adjacent the cutting means where a fabric, such as that indicated at 20, may be placed over the riser to be pleated or pressed into the slits thus forming the piping configuration. As indicated in FIG. 3, a piece of fabric 20, preferably cut to a predetermined shape and size, corresponding roughly to the covering desired, is thus layed over riser 22 and support fingers 62.

The forming means assembly 64 consists of a plurality of spaced, substantially parallel forming bars 66 as can best be seen in FIGS. 3, 4, 8 and 9 which carry elongated blade-like bodies or edge portions 68, preferably made of a plastic material such as delrin and best seen in FIGS. 8 and 9. Alternatively, forming bars 66 may include blade-like bottom edges integrally. The number of bars 66 is selected to correspond to the number of cutting blades with which the bars are aligned and positioned as shown to match the slits cut into the riser by router means 50. Bars 66 are carried by a suspension linkage and spring return mechanism consisting of pairs of short arms 70 pivotally connected at opposite ends of each bar. The short arms are pivotally mounted upon a frame member 72 or the like such that the bars can be lowered to the work surface and raised away from it with a reciprocating movement when a downward force is applied to them.

Bars 66 are maintained in a normally raised position by springs 76 which connect to the bars and to a support member 77 to urge the bars upwardly. The bars are preferably lowered in a predetermined sequential pattern, which will be described further hereinbelow, by a cam and cam follower assembly means which may comprise individual cams 78, as best seen in FIG. 4, carried on a rotatable shaft 80 immediately above each bar 66 and individual cam followers 82 carried on each bar 66 as best seen in FIG. 3. Cams 78 may also take the form of a plurality of spaced, raised arcuate strips mounted on the surface of a single drum extending over the width of the forming means crosswise to the work surface. The cam followers 82 preferably take the form of a roller carried in a bracket on the upper surface of bar 66 as shown in FIGS. 3 and 9. Followers 82 are sequentially engaged in a predetermined pattern by cams 78 as the cams rotate with shaft 80 when it is driven, via belt 86 for example, by a suitable drive means 87 which will be more fully described hereinbelow in connection with FIG. 11. In any event, rotation of shaft 80 provides for the pressing of the fabric into the slits by individually lowering each forming bar to the work surface in a predetermined sequential fashion due to the arrangement of cams 78 on shaft 80 to engage the followers in the desired sequential pattern. For example, as shown in FIGS. 9 and 10, the center forming bar 66a has been arranged to be the first one contacted by its corresponding cam 78a to be lowered to press the fabric into the riser material on the work surface. As it is lowered, it pleats fabric 20 into slit 28 as shown. Cams 78b to each side of center cam 78a are arranged on shaft 80 to engage their corresponding forming bars 66b at a slightly later time in the rotation of shaft 80 then the central cam 78a thus allowing the central forming bar 66a to pleat the fabric into a slit first followed by the forming bars 66b to each side thereof and so on. The outermost forming bars 66c are the last ones to pleat the fabric into corresponding slits. Thus the fabric is pleated into the slits in the riser sequentially from the centermost slit outwardly to the edges and pinching of the material is avoided. Many other sequential pleating patterns are obvious. For example, the cams may be arranged to activate the formers sequentially from one side of the material to the other in the case where only a few pipes are being formed.

The cam surfaces are each shaped to allow for a slight upward retraction of each forming bar at the end of the downward stroke to avoid pinching of the material between the forming bars when they are in the lowered pressing position. For example, the cam arrangement shown in FIG. 10 includes raised portions 79 on each cam for depressing each respective cam follower 82. However, when the cams are rotated such that portions 81 contact a follower 82, the follower and forming bar are allowed to rise up from the surface slightly to avoid the pinching effect. Of course, when a cam follower is contacted by any of the remaining surface portions 78 of the cams, the follower assumes its normal raised position. As can be seen from the figure, surfaces 79 and 81 vary in peripheral length on the cam depending on the desired sequence of operation.

The rotation of shaft 80 and hence operation of the cams, cam followers and forming bars is controlled by drive means 87 which is more fully described in FIG. 11. The drive means includes a motor 88 controlled by switch assembly 89. When the apparatus is in use motor 88 runs constantly. Shaft 80 is rotated only when clutch 94 is engaged. Clutch 94 may be any of the many types well known in the art. The one shown for illustration is a solenoid operated clutch with a spring biased brake which contacts the clutch when the clutch is disengaged as shown.

When button 96 in "on," solenoid 98 is energized to engage clutch 94, as shown in phantom outline, causing shaft 80 to rotate cams 78 and lower the forming bars to the pressing position. Cams 78 turn until the additional cam 90 engages limit switch 104. Engagement of limit switch 104 causes it to open and stop the rotation of shaft 80 by de-energizing solenoid 98 and clutch 94 which is immediately stopped by contact with spring biased brake 105. Thus, all the cams are stopped with cam portions 81 contacting the cam followers and placing the forming bars in the lower position. At this time, timer 106, such as a 57 second Haydon General Time type DA11A032D, is activated for a predetermined period of time which corresponds to the amount of time required for the sewing operation. Activation of timer 106 assures that shaft 80 will be immobile and the forming bars will be held in a pressing position during the complete sewing operation.

At the expiration of the predetermined time period, the timer energizes solenoid 98 causing shaft 80 to rotate until cam 90 engages limit switch 108 at which time the solenoid is de-energized, the clutch is disengaged, the brake is applied and the cams 66 have been returned to their original starting position to allow the forming bars to assume their raised position.

The operation of additional cam 90 may be better understood with reference to FIGS. 12-14 wherein FIG. 12 shows the cam in its original position before any rotation of shaft 80. Cam 90 includes two spaced posts 110 and 112 for engaging limit switches 104 and 108 respectively. When shaft 80 has rotated to a position at which all the cams portions 81 are in contact with their respective cam followers and the forming bars are in the slightly retracted pressing position, short post 110 on cam 90 has rotated to engage limit switch 104 as shown in FIG. 13. When timer 106 energizes solenoid 98 to continue the rotation of shaft 80 at the expiration of the timed predetermined interval, long post 112 engages limit switch 108 to de-energize solenoid 98 and stop rotation of shaft 80.

A sewing machine means adjacent the forming means, is generally indicated at 116 in FIGS. 3 and 4. A Singer 300 W194 type may be used when five needles are necessary for sewing. A Fales machine of the heavy duty double thread chain stitch type may be used if a greater number of needles are required.

As shown in FIGS. 3 and 4, the sewing machine means is positioned for sewing the covering after the fabric has been pressed into the riser slits. Sewing machine 16 operates in unison with chain drag 36 by connection to motor 42 to move the material over the work surface past the sewing machine for sewing following the pressing step. The sewing machine means is operated by switch 46 and is activated by an operator when the forming bars have been lowered by the forming means. After the fabric covered section of riser material is sewed, it passes through a pull-out roll assembly 120 which consists of the set of two rubber rolls positioned at the end of the work surface and driven by motor 42 also. The bottom roll may be appropriately slotted to allow for passage of the chain drive. As previously pointed out, activation of the sewing means also causes chain drag 36 to move the material over the work surface. Therefore, the speed with which the material moves through the apparatus is synchronized at the proper speed and tension for sewing. As the covering leaves the work surface it may be folded for storage or cut into the desired lengths as desired.

Having described the invention, what is claimed is:

1. Apparatus for preparing piped covering material comprising:
   an elongated work surface adapted to receive riser material at one end thereof;
   conveyor means associated with the work surface for moving the riser material from the one end thereof to the other;
   cutting means associated with the work surface near the one end thereof for cutting a plurality of substantially parallel slits in the riser material as it is moved away from the one end after which a fabric may be placed over the riser to cover the slits;
   forming means associated with the work surface and aligned with and adjacent to the cutting means for pressing the fabric into the slits thereby forming the pipes;
   sewing means associated with the work surface and aligned with and adjacent to the forming means for sewing the fabric to the riser in each slit;
   means for activating and de-activating the conveyor means whereby it may move the riser material away from the one end past the cutting means for forming the slits, stop the movement when the riser is under the forming means and then move the material past the sewing means, and
   means for lowering and raising the forming means whereby the fabric is pressed into the slits.

2. The apparatus according to claim 1 wherein;
   the conveyor means comprises a chain drag assembly carried by the work surface.

3. The apparatus according to claim 1 wherein;
   the cutting means comprises a plurality of spaced cutting disks rotatably mounted on a shaft supported transversely with respect to the work surface, the disks being supported with respect to the surface so as to cut substantially parallel slits in the riser material as it moves between the disks and the work surface.

4. The apparatus according to claim 1 wherein;
   the forming means has a normally raised position and comprises a plurality of spaced substantially parallel bars carried above the work surface, each bar including an elongated downwardly oriented edge portion aligned so as to correspond spatially with the cutting means and the slits formed thereby.

5. The apparatus according to claim 4 including;
   spring means connected to the forming means to urge it to its normal raised position, and a cam and cam follower assembly means for lowering the bars, the assembly including rotatably mounted cam means carried above each bar, a cam follower carried on the top of each bar positioned for engagement by the cam means whereby the bar is urged toward the work surface when the cam means is rotated to engage the follower.

6. The apparatus according to claim 5 wherein the lowering and raising means includes drive means comprising;
   an electrical motor;
   clutch means for engaging the motor with the shaft carrying the cam means for rotation thereof, the clutch means being normally disengaged;
   electrical means for engaging the clutch with the motor;
   timer means and first and second normally closed limit switches in electrical circuit with the electrical means,
   means carried by the shaft for opening the first limit switch upon rotation of the shaft and cams to a first position whereby the electrical means is de-energized to disengage the clutch means and the timer is activated for a predetermined time period after which it energizes the electrical means to engage the clutch means and rotate the shaft to a second position, and
   means carried by the shaft for engaging the second limit switch when the shaft is rotated to the second position whereby the electrical means is de-energized to disengage the clutch means and rotation of the shaft is stopped.

7. The apparatus according to claim 5 wherein;
   each bar is individually operable by the cam and cam follower assembly means.

8. The apparatus according to claim 7 wherein;
   the cam means comprises a plurality of individual cams with one cam being positioned above each bar, the cams being fixed on a shaft and so arranged with respect to each other as to engage the corresponding followers on the bars in a predetermined sequence when the shaft is rotated.

9. The apparatus according to claim 5 wherein;
   the cam means is so shaped as to allow the bars to rise slightly from the work surface after being lowered to avoid pinching of the material.

10. The apparatus according to claim 1 wherein the means for activating the conveyor means simultaneously activates the sewing means.

11. A method of preparing piped covering material comprising the steps of;
    cutting a plurality of substantially parallel slits in a riser,
    covering the riser with a fabric,
    pressing the fabric into the slits, and
    sewing the fabric to the riser by stitching it at the bottom of the slits.

12. The method of claim 11 wherein;
    the riser is urethane with a backing and the slits are cut to a depth of about two-thirds of the thickness of the urethane.

* * * * *